(12) United States Patent
Witte

(10) Patent No.: US 11,878,667 B2
(45) Date of Patent: Jan. 23, 2024

(54) METHOD FOR DECELERATING A MOTOR VEHICLE DURING EMERGENCY BRAKING USING AN ELECTRIC MOTOR OF AN ELECTRIC DRIVE OF THE MOTOR VEHICLE AND A BRAKING TORQUE OF A SERVICE BRAKE SYSTEM OF THE MOTOR VEHICLE, AND A MOTOR VEHICLE

(71) Applicant: Volkswagen Aktiengesellschaft, Wolfsburg (DE)

(72) Inventor: Bastian Witte, Groß Schwülper (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 226 days.

(21) Appl. No.: 17/600,816

(22) PCT Filed: Mar. 30, 2020

(86) PCT No.: PCT/EP2020/058950
§ 371 (c)(1),
(2) Date: Oct. 1, 2021

(87) PCT Pub. No.: WO2020/201212
PCT Pub. Date: Oct. 8, 2020

(65) Prior Publication Data
US 2022/0194332 A1   Jun. 23, 2022

(30) Foreign Application Priority Data
Apr. 2, 2019 (DE) ...................... 10 2019 204 708.4

(51) Int. Cl.
*B60T 7/12* (2006.01)
*B60W 60/00* (2020.01)
(Continued)

(52) U.S. Cl.
CPC ............ *B60T 7/12* (2013.01); *B60L 15/2009* (2013.01); *B60T 1/10* (2013.01); *B60W 10/184* (2013.01);
(Continued)

(58) Field of Classification Search
None
See application file for complete search history.

(56) References Cited

U.S. PATENT DOCUMENTS

| 6,132,015 A | 10/2000 | Aoyama .................. 303/152 |
| 6,641,233 B2 | 11/2003 | Kusano et al. ............ 303/152 |

(Continued)

FOREIGN PATENT DOCUMENTS

| DE | 102009039347 A1 | 3/2011 | ............... B60L 7/24 |
| DE | 102012215328 A1 | 3/2014 | ............... B60L 7/24 |

(Continued)

OTHER PUBLICATIONS

International Search Report and Written Opinion, Application No. PCT/EP2020/058950, 19 pages, dated Jun. 29, 2020.

*Primary Examiner* — Adam D Tissot
*Assistant Examiner* — Garrett F Evans
(74) *Attorney, Agent, or Firm* — Slayden Grubert Beard PLLC

(57) ABSTRACT

The invention relates to a method for decelerating a motor vehicle during emergency braking, wherein the entire emergency braking is automatically carried out by a longitudinal dynamics system of the motor vehicle, wherein, for emergency braking, a total braking torque is automatically generated by the longitudinal dynamics system of the motor vehicle, and, for this purpose, a first braking torque is generated at least as a proportion of the total braking torque by an electric motor of an electric drive of the motor vehicle in a time interval beginning with the automatic initiation of the emergency braking and shorter than the total duration of the emergency braking, in which time interval the total braking torque cannot yet be generated solely by a service brake system of the longitudinal dynamics system. The invention also relates to a motor vehicle.

19 Claims, 1 Drawing Sheet

(51) Int. Cl.
*B60L 15/20* (2006.01)
*B60T 1/10* (2006.01)
*B60W 10/184* (2012.01)

(52) U.S. Cl.
CPC ..... *B60W 60/001* (2020.02); *B60W 2710/083* (2013.01); *B60W 2710/18* (2013.01)

(56) References Cited

U.S. PATENT DOCUMENTS

| | | | |
|---|---|---|---|
| 2012/0031692 A1 | 2/2012 | Koike et al. | 180/65.25 |
| 2015/0202989 A1* | 7/2015 | Bussmann | B60T 7/04 |
| | | | 701/70 |
| 2018/0079313 A1 | 3/2018 | Foitzik et al. | |
| 2018/0154777 A1* | 6/2018 | Hall | B60L 7/18 |
| 2018/0290642 A1 | 10/2018 | Tschiene et al. | |

FOREIGN PATENT DOCUMENTS

| | | | | |
|---|---|---|---|---|
| DE | 102014218068 A1 | 3/2016 | | B60L 7/26 |
| DE | 102017209721 A1 | 10/2018 | | B60W 50/02 |
| DE | 102019204708 A1 | 10/2020 | | B60T 7/12 |
| EP | 1110836 A2 | 6/2001 | | B60T 13/68 |
| EP | 1557334 A2 | 7/2005 | | B60T 13/74 |
| EP | 1839985 B1 | 10/2007 | | B06K 6/48 |
| EP | 2213539 A1 | 8/2010 | | B60K 6/48 |
| EP | 2463165 A1 | 6/2012 | | B60T 1/10 |
| EP | 2560851 B1 | 3/2015 | | B60T 1/10 |
| JP | 06171489 A | 6/1994 | | B60K 1/02 |
| WO | 2016/146277 A1 | 9/2016 | | B60T 8/40 |
| WO | 2020/201212 A1 | 10/2020 | | B60T 1/10 |

\* cited by examiner

METHOD FOR DECELERATING A MOTOR VEHICLE DURING EMERGENCY BRAKING USING AN ELECTRIC MOTOR OF AN ELECTRIC DRIVE OF THE MOTOR VEHICLE AND A BRAKING TORQUE OF A SERVICE BRAKE SYSTEM OF THE MOTOR VEHICLE, AND A MOTOR VEHICLE

CROSS-REFERENCE TO RELATED APPLICATIONS

This application claims priority to German Patent Application No. DE 10 2019 204 708.4, filed on Apr. 2, 2019 with the German Patent and Trademark Office. The contents of the aforesaid Patent Application are incorporated herein for all purposes.

TECHNICAL FIELD

One aspect of the invention relates to a method for decelerating a motor vehicle during emergency braking. A further aspect of the invention relates to a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Service brake systems of modern motor vehicles, for example passenger vehicles, often have hydraulic brakes both on a front axle and a rear axle of the motor vehicle. These hydraulic brakes are used as service brakes to effectively decelerate and thus brake the motor vehicle during operation, i.e., during travel. In hydraulic brakes, brake fluid is displaced into the wheel brakes through brake lines. This volume displacement is necessary because of the elasticities of the brake hoses, brake lines, brake pads, and brake fist or brake caliper. Up to the intervention threshold of an anti-lock braking system of the motor vehicle, at approximately 80 bar, there is approximately a total of 15 cm$^3$ of brake fluid across all four wheels in the case of mid-size vehicles.

In motor vehicles which are driven by a driver himself/herself, are also braked in this context and in which the driver presses a corresponding brake pedal of the motor vehicle for this purpose, the foot force of the driver, together with the force of the brake booster, acts on the piston in the master brake cylinder. The brake pressure is generated at this point, and the brake fluid is displaced into the wheel brake by the forward movement of the brake pedal and of the piston connected thereto in the master brake cylinder.

Automatic or autonomous motor vehicles are also known. In these motor vehicles, the brake pressure and the associated displacement of the brake fluid into the wheel brakes must be generated completely by the brake system itself. In a slip control system (Electronic Stability Control—ESC), the electrically driven return pump thereof is used for this purpose. In an active vacuum brake booster, the pressure difference within the two booster chambers is increased so that the force on the piston of the master brake cylinder is increased and the brake fluid volume is displaced. In an electromechanical brake booster, the force on the master brake cylinder is increased by its electric motor via a spindle or rack, and the brake fluid volume is displaced.

These automated processes take longer in known designs of the systems than if an experienced driver presses the brake pedal very quickly and hard with their foot. In this case, the period of time from the first braking intention up to the time point at which the first front wheel has reached the locking brake is considered. From this time point, the anti-lock braking system is activated to prevent wheel locking, and deceleration cannot be further increased.

In the case of an electromechanical brake booster this period of time is approximately 200 ms, in the case of a six-piston slip control system this period is approximately 400 ms, and in the case of a two-piston slip control system this period is approximately 600 ms. A vehicle driver pressing a brake pedal manages this under optimum conditions in approximately 120 ms. In automatic vehicles, however, the driver is not involved in the task of driving and will not activate the braking process manually.

For example in the case of autonomous motor vehicles with autonomy level 5, there is no longer a brake pedal at all. For example, in autonomous vehicles there is the problem that the active brake pressure build-up in all current brake systems is slower without assistance by the driver's foot than in the case of active braking by the driver themselves when the driver presses a provided brake pedal. Thus, in the event of emergency braking of the motor vehicle, the stopping distance, defining the distance from the initial braking intention until a standstill, is extended, for example by approximately 4 m when braking from 100 km/h.

SUMMARY

A need exists to provide a method in which, during emergency braking, the braking torque may be built up as quickly as possible on at least one wheel.

The need is addressed by a method and a motor vehicle according to the independent claims. Embodiments of the invention are described in the dependent claims, the following description, and the drawings.

DESCRIPTION

Figure 1:
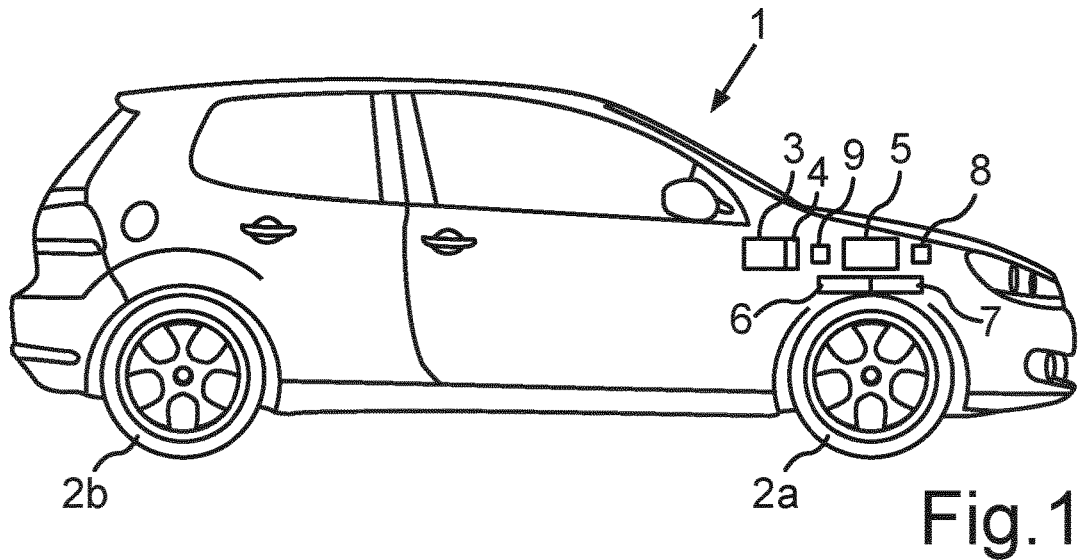
FIG. 1 shows a schematic representation of an exemplary embodiment of a motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

One exemplary aspect relates to a method for decelerating a motor vehicle during emergency braking. The entire emergency braking is carried out automatically by a longitudinal dynamics system of the motor vehicle. The longitudinal dynamics system has an electric motor of an electric drive of the motor vehicle, which electric motor generates a first braking torque during emergency braking. Moreover, the longitudinal dynamics system has a separate service brake system. For emergency braking, a total braking torque is automatically built up or generated by the longitudinal dynamics system of the motor vehicle. This total braking torque acts at least on one drive wheel of the motor vehicle. The total braking torque is generated in such a way that a first braking torque is generated at least as a proportion of the total braking torque by the electric motor of an electric drive of the motor vehicle in a time interval beginning with the automatic initiation of the emergency braking and shorter than the total duration of the emergency braking, and in which time interval the total braking torque cannot yet be generated solely by a service brake system of the longitudinal dynamics system.

In order to generate the total braking torque, a first braking torque is generated or built up by an electric motor of an electric drive of the motor vehicle, and a measurable second braking torque during emergency braking is generated partially simultaneously with the first braking torque by means of a service brake system of the motor vehicle. The emergency braking is thus automatically initiated by a longitudinal dynamics system of the motor vehicle and the total braking torque is built up. For example, the second braking torque generated by the service brake system of the motor vehicle is built up or generated independently or automatically by the service brake system. In addition or instead of this, it is possible for a total braking torque to be automatically generated or built up by the longitudinal dynamics system of the motor vehicle for the purpose of emergency braking, wherein only the first braking torque generated by the electric motor is built up in a time interval beginning with the automatic initiation of the emergency braking which is shorter than the entire duration of the emergency braking.

It should be noted that the service brake system also operates or is activated when emergency braking is started, but there is no measurable second braking torque or none is generated by the required displacement of the brake fluid.

The proposed method makes it possible to provide a target braking torque or total braking torque as requested from the longitudinal dynamics system as quickly as possible. In this case, the proportion of the total braking torque which the service brake system cannot generate or cannot yet generate in the time interval which begins with the emergency braking and is shorter than the total duration of the emergency braking until the motor vehicle is at a standstill is applied solely by the electric motor as far as possible and/or additionally. This takes place for example for the time interval until the total braking torque is produced solely by the second braking torque.

The proposed method makes it possible for the electric motor of the electric drive to be used in such a specific deceleration scenario, namely emergency braking, in a motor vehicle in the form of an electric vehicle or hybrid vehicle. Electric motors may change their drive or braking torque very quickly. Times of approximately 2 ms are technically possible in this context. In such a short time interval, the electric motor may change its torque from a value of 0 to a maximum torque.

This procedure makes it possible to achieve improved emergency braking for example in motor vehicles which generate the required braking action and thus the build-up of the required braking torque without the pressing of a brake pedal by a driver. This means that even in the case of such configurations in which no brake pedal is pressed or may be pressed by a driver, it is now also possible to achieve an optimally very high level of braking action. Particularly with these configurations, emergency braking may also be carried out in this context without the deceleration distance or the stopping distance being undesirably increased.

As a result of the above-described possibilities, a braking torque of the electric motor and a braking torque of the service brake system may thus be generated simultaneously in a specific time phase in order to be able to achieve the best possible deceleration here and thus in this specific time phase. Secondly, a braking torque may also be built up immediately by the electric motor in the already mentioned other time interval at the start of emergency braking. In this regard, the above-mentioned technical advantage of an electric motor, which may build up a braking torque very quickly, may even be used before a service brake system may build up its braking torque.

This scenario is possible in an autonomous motor vehicle. For example, it is beneficial in a motor vehicle which is operated autonomously with autonomy level 5. By definition, a motor vehicle which has autonomy level 5 has no pedals. As a result, in the case of such a configuration of a motor vehicle, it is fundamentally no longer possible for a driver to press a brake pedal. Particularly in the case of such configurations, the proposed manner of executing emergency braking is particularly beneficial because of the problems described at the outset.

However, it may also be beneficial if the motor vehicle has a brake pedal and it is fundamentally possible for a driver to press this brake pedal. Even in the case of such a configuration, it is possible for an electronic processing unit to be used initially to check whether the brake pedal is pressed by a driver, for example within a predefined time interval, and if this is not the case, the scenario described above is carried out during emergency braking. Thus, even in the case of configurations of a motor vehicle in which a brake pedal would still be present in principle, but the pedal still not be pressed by the driver within a very short time interval, the automatic deceleration scenario explained above is carried out. For example, a brake pedal might not be pressed if the driver is, for example, inattentive and does not discern the traffic situation or does not consider emergency braking necessary. On the other hand, this may also be beneficial if the experienced driver discerns a specific traffic situation, but incorrectly gauges it and therefore does not press the brake pedal or presses the brake pedal with delay. For example, the scenario described above is also beneficial if a motor vehicle has a brake pedal and it is found that the driver does not discern a critical traffic situation in which emergency braking is required, for example as a result of fatigue or the act of already dozing off, and thus is very unlikely to press the brake pedal. In addition, in vehicles which have autonomy level 4 or autonomy level 3, for example, it is possible for a driver of the vehicle, who still has a brake pedal, to incorrectly gauge the situation and assume that a traffic situation is resolved or is handled by the vehicle itself on the basis of its preset autonomy level and, in this context, to possibly forget or misjudge that he/she as the driver has to press the brake pedal him/herself. This may occur particularly in the case of such configurations in which subtasks are carried out and managed by the vehicle itself, and yet, on the other hand, in other situations the driver himself/herself has to carry out relevant actions. This is particularly the case, for example, if in fast-developing situations the driver, because of nervousness or misjudgment about the occurrence of a certain situation, momentarily forgets what action to perform himself/herself. In these situations, if the brake pedal is not actually pressed by the driver within a specific time interval, such a situation may be detected and then emergency braking may be automatically performed by the longitudinal dynamics system as described above. This is then carried out without input by the driver. This means that the automatic emergency braking is carried out completely without the pressing of a brake pedal by a driver. This is then also independent of whether such a brake pedal is present or not.

In general, it is possible for the requirement of fully automatic performance of emergency braking to be determined by an electronic processing unit of the motor vehicle. It is thus determined when emergency braking is required and must begin. For this purpose, environmental information of the surroundings of the motor vehicle and/or information about the motor vehicle itself, for example operating parameters, may be taken into account. Environmental information may be detected, for example, by means of at least one detection unit of the motor vehicle itself and/or detected in some other way and provided to the motor vehicle. Emergency braking may thus also be necessary if this need arises as a result of the operating situation of the motor vehicle during travel, for example as a result of a failure of a functional component of the motor vehicle.

For example, in the case of automatic starting of emergency braking by the longitudinal dynamics system in a time interval beginning with the automatic initiation of emergency braking up to a measurably generated second braking torque of the service brake system, only the first braking torque of the electric motor is generated to apply the total braking torque. In some embodiments, it is thus possible for only the first braking torque of the electric motor to be measurably generated in the case of automatic starting of emergency braking by the longitudinal dynamics system. This is then for example the above-mentioned further duration or respectively the further time interval. Since the electric motor, as already described above, may build up a braking torque very quickly and, for example, significantly quicker than the service brake system, the emergency braking is then first performed only with the generated braking torque of the electric motor. In this phase, only the first braking torque of the electric motor constitutes the total braking torque.

For example, the first braking torque is automatically generated only up to a braking torque limit value. An anti-lock braking system of the motor vehicle is activated at this braking torque limit value. For example, the first braking torque is built up very quickly, for example as quickly as possible. For example, this takes place within a time interval of less than 3 ms.

The first braking torque is for example built up to a braking torque limit value faster than a time interval that begins with the automatic initiation of emergency braking up to a measurably generated second braking torque of the service brake system. Thus, within a time interval in which the first braking torque has been built up to the braking torque limit value, the emergency braking is carried out only or substantially only with this first maximum braking torque, which corresponds to the braking torque limit value. For example, the increase in the first braking torque is terminated by the electric motor of the electric drive when the first braking torque has reached the braking torque limit value. This means that the first braking torque is not increased beyond the braking torque limit value. For example, the first braking torque is regulated in such a way that it holds the built-up first braking torque at the braking torque limit value or substantially at the braking torque limit value. This takes place for example until the second braking torque of the service brake system is built up. For example, in this context, the first braking torque is generated in cooperation with the anti-lock braking system in such a way that, when a first drive wheel reaches the locking limit, the generation of the first braking torque is kept substantially constant and for example in the region of the braking torque limit value.

A drive wheel may be a front wheel or a rear wheel. In a motor vehicle all-wheel drive, a front wheel and a rear wheel may also be drive wheels.

In some embodiments, in the time interval of emergency braking in which the first braking torque and a measurable second braking torque are generated simultaneously, these two braking torques are generated in such a way that the sum remains substantially constant. For example, this means that the sum of the braking torques is around the braking torque limit value in a value range of +/−20%, for example +/−15%, for example +/−10%. As a result, a fastest possible deceleration of the motor vehicle may also be achieved in this further, for example second, time interval, which for example directly follows the above-mentioned first time interval in which only the first braking torque is present.

In some embodiments, in the time interval of emergency braking in which the first braking torque and the measurable second braking torque are generated simultaneously, the first braking torque is reduced, for example continuously reduced, and the second braking torque is increased, for example continuously increased. This also means that the first braking torque is reduced as the second braking torque increases. In addition, when the service brake system may therefore build up its braking torque, its braking torque is priority, so to speak, and the first braking torque of the electric motor may be reduced.

It is possible for the rise in the measurable second braking torque in this second time interval to be linear or to be considered linear at least in a first approximation of the characteristic curve. In addition or instead of this, it is possible for the drop in the first braking torque in this second time interval, for example likewise, to be linear or to be considered linear at least in a first approximation of the characteristic curve. For example, in such a configuration, it is possible for the characteristic curves of the braking torques in this second time interval to each be generated in an equal but opposite manner.

It should be noted, however, that other braking torque curve shapes may also be provided in this second time interval. For example, this may also depend on which environmental conditions, such as temperature, prevail in the surroundings of the motor vehicle. These environmental conditions may influence the brake fluid, for example its viscosity. As a result, different curves, for example of the second braking torque, are also obtained in different environmental conditions when said second braking torque is built up.

In a beneficial manner, the first braking torque is reduced in this second time interval as a function of the increase in the second braking torque. This means that the build-up of the second braking torque, as it were, determines how the reduction in the first braking torque has to take place, for example when a specific sum value of the two braking torques is to be achieved by the sum of the two braking torques.

In some embodiments, the first braking torque is reduced in such a way that the first braking torque is 0 when the second braking torque is increased to a braking torque limit value at which an anti-lock braking system of the motor vehicle is activated. For example at this time point, the contribution of the electric motor for decelerating the motor vehicle during emergency braking is then no longer needed and the total braking torque is then for example generated only by the second braking torque from this time point.

For example, a first time interval in which only the first braking torque is measurably generated and thus only the first braking torque contributes to the total braking torque, and up to a braking torque limit value at which an anti-lock braking system of the motor vehicle is activated, is shorter than a second time interval in which the first braking torque and the measurable second braking torque are generated simultaneously. In some embodiments, it is possible for the first time interval to be at most half of the second time interval. However, this is to be understood by way of example only and is not intended to be limiting. Other ratios between the time intervals are therefore also possible.

It is possible for the service brake system to be a two-piston slip control system. For example, in such an embodiment, the duration from a braking intention up to a time point at which the build-up of the second braking torque begins is approximately 200 ms. The time period in which the second braking torque is built up in this two-piston slip control system (as considered from the braking intention) up to the braking torque limit value is approximately 600 ms.

However, it is also possible for the service brake system to be a six-piston slip control system. For example, in such an embodiment, the duration from a braking intention up to a time point at which the build-up of the second braking torque begins is approximately 150 ms. The duration in which the second braking torque is built up in this six-piston slip control system (as considered from a braking intention) up to the braking torque limit value is approximately 400 ms.

However, it is also possible for the service brake system to be an electromechanical brake booster. For example, in such an embodiment, the duration from a braking intention up to a time point at which the build-up of the second braking torque begins is approximately 30 ms. The time point at which the second braking torque is built up in this electromechanical brake booster (as considered from a braking intention) up to the braking torque limit value is approximately 150 ms.

A further exemplary aspect relates to a motor vehicle having a plurality of wheels and having an electric drive for generating electric drive energy for the motor vehicle. The motor vehicle furthermore has a longitudinal dynamics system which uses an electric motor of the electric drive of the motor vehicle in order to generate a braking torque at least during an emergency braking of the motor vehicle, and a separate service brake system for this purpose. In addition, the motor vehicle has an electronic processing unit which is designed to carry out a method according to the above-mentioned aspect or any embodiment(s) thereof. For example, this method is carried out with the motor vehicle, for example by the electronic processing unit. The electronic processing unit may be an open-loop and/or closed-loop control unit. It may be a component of the electric drive and/or the service brake system.

The motor vehicle may also have one or more sensors which capture information that may be provided to the electronic processing unit, for example for carrying out the method. This may be both environmental information and information of components of the motor vehicle itself. For example, this may also be information of a longitudinal dynamics system itself.

The present aspect makes it possible for example to use an electric drive of the motor vehicle briefly in the event of emergency braking to support the service brake system. For example, at the start of emergency braking, the electric motor of the electric drive builds up a very high braking torque in a relatively short period of time. In this case, a maximum braking torque of the electric motor should be built up. This maximum braking torque corresponds for example to a braking torque limit value from which an anti-lock braking system of the motor vehicle becomes active. For example, the braking torque of the electric motor is generated while the service brake system builds up its braking torque by the delayed brake pressure and cannot supply enough of it, for example cannot supply it up to a braking torque limit value.

In the context of the present teachings, emergency braking is understood to mean a high deceleration of the motor vehicle of, for example, more than 3 m/s$^2$. Additionally or alternatively, the emergency braking may also be present in the case of deceleration dynamics of more than 10 m/s$^3$. The dynamics, which may also be referred to as jerk, corresponds in this case to the time derivative of the deceleration. Such large values for deceleration and dynamics are not achieved during normal driving operation.

Especially if the motor vehicle is for example operated in autonomy level 5 and thus in a fully automated manner, it is not least for the sake of weight reduction that a brake pedal is dispensed with. If deceleration and thus braking of the motor vehicle is necessary, an automatic driving function of the motor vehicle can, for example, request the deceleration of the motor vehicle by the electronic processing unit, which may also be referred to as a brake control system. The autonomous driving operation of the motor vehicle may take place by means of the automatic driving function. The electronic processing unit may determine a demand-driven braking torque distribution for all the wheel brakes of the service brake system by taking into account driving dynamic properties of the motor vehicle and known torque build-up dynamics of the service brake system and of the electric motor. In a service brake system, in the case of a brake caliper associated with the at least one drive wheel, a brake piston of a wheel brake may act to brake the at least one drive wheel using a brake pad. By activating the service brake system, the brake pad can, for example, be pressed on a brake disk to exert the second braking torque on the drive wheel. It is possible for a brake pressure used to apply the second braking torque to be built up by a hydraulic return pump of the service brake system. The hydraulic return pump of the service brake system may be a component of a slip control system of the motor vehicle. The slip control system may have an anti-lock braking system. In addition, the slip control system may comprise a traction control system and/or a control to prevent the motor vehicle from fishtailing, known as a dynamic stability control system.

The invention also includes combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a simplified representation of a motor vehicle 1. The motor vehicle 1 is a passenger vehicle. The motor vehicle 1 has two front wheels, of which the right front wheel 2a may be seen in the side view shown. In addition, the motor vehicle 1 has two rear wheels, of which the right rear wheel 2b is shown in FIG. 1.

The motor vehicle 1 is a hybrid vehicle or an electric vehicle. In this respect, it has an electric drive 3. The electric drive 3 has an electric motor 4. Electrical energy is bidirectionally converted with the electric drive 3 into mechanical energy, by means of which the motor vehicle 1 may be driven and braked.

In addition, the motor vehicle 1 has a longitudinal dynamics system 5. The longitudinal dynamics system 5 has a service brake system 6 which is separate from the electric motor 4. The service brake system 6 may be a hydraulic brake. A slip control system 7 may be associated with the service brake system 6. In addition, the motor vehicle 1 may additionally have a dynamic stability control system 8.

For example, the motor vehicle 1 has an electronic processing unit 9. The electronic processing unit 9 may be an open-loop and/or closed-loop control unit.

The motor vehicle 1 may be configured for example by the electronic processing unit 9 to carry out a method for decelerating the motor vehicle 1 during emergency braking, which is explained below. For example, the present method is carried out.

Figure 2:
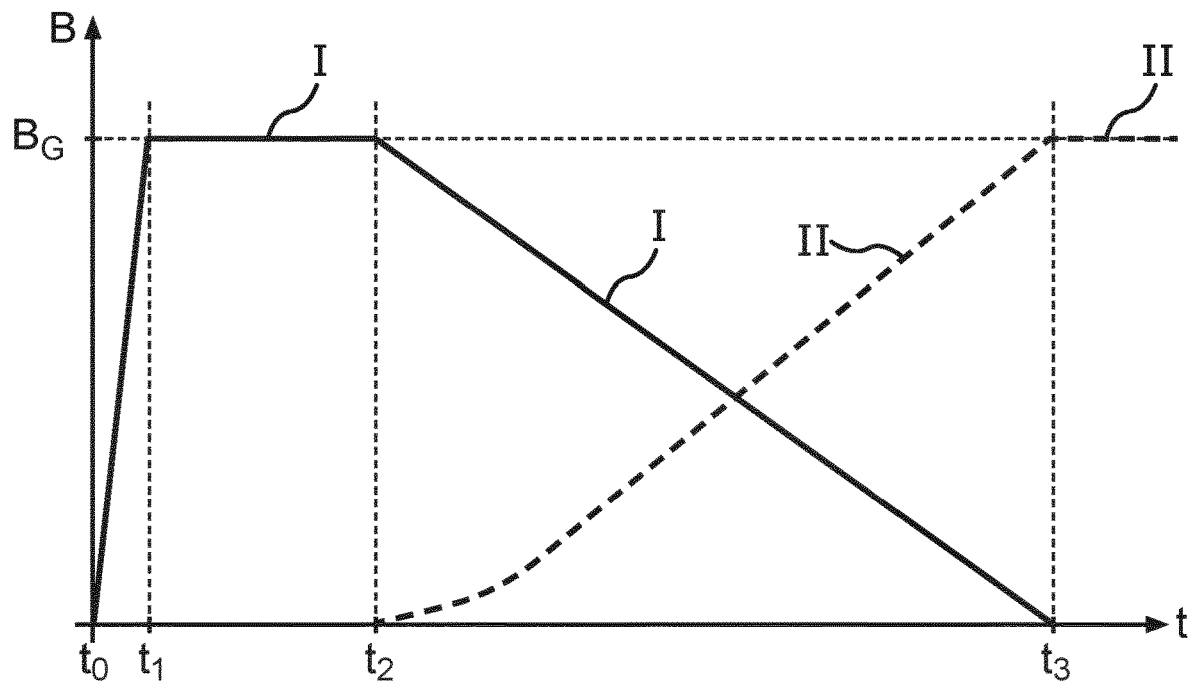
FIG. 2 is a simplified exemplary diagram in which a curve of a total braking torque of a motor vehicle over time is shown for emergency braking.

FIG. 2 also shows a diagram in which a braking torque B is shown as a function of time t. In the method, the emergency braking is automatically initiated by the longitudinal dynamics system 5 of the motor vehicle 1. This means for example that the emergency braking is carried out completely without pressing a brake pedal. This may be the case when the motor vehicle 1 is a fully autonomous vehicle which has autonomy level 5. In configurations of this type, the motor vehicle 1 then basically no longer has a brake pedal. Automatic initiation of the emergency braking can, however, also occur when the motor vehicle 1 has a brake pedal which is not pressed by the driver during emergency braking for specific reasons. For example in such a case, the electronic processing unit 9 may also be designed to detect and process such a situation.

In fully automatic emergency braking of this kind, a total braking torque is automatically generated by the longitudinal dynamics system 5 of the motor vehicle 1. During emergency braking, a first braking torque is generated by the electric motor 4, which is to be regarded as a component of the longitudinal dynamics system 5 during this deceleration. FIG. 2 shows that the automatic emergency braking or independent emergency braking performed by the system begins at a time point t0. At this time point t0, a first braking torque is then built up very quickly until a braking torque limit value $B_G$ is reached. In the example shown, this first braking torque reaches the braking torque limit value $B_G$ at a time point t1. This is particularly the case after approximately 2 ms. The service brake system 6 also operates from the time point t0. Owing to the required displacement of the brake fluid, however, no measurable second braking torque is built up by the service brake system 6 until time point t2. Therefore, until time point t2, the total braking torque is provided only by the first braking torque.

The braking torque limit value $B_G$ is that braking torque at which the wheels, for example the front wheels 2 in the case of a front drive or all-wheel drive, would just lock, i.e. from this time point the anti-lock braking system 7 would be applied or is applied.

In the diagram according to FIG. 2, the curve of the first braking torque is shown by the characteristic curve I, as is generated by the electric motor 4 during this emergency braking.

From the time point t1 to a time point t2, the total braking torque of the longitudinal dynamics system 5 during this emergency braking is generated only by the first braking torque of the electric motor 4, as already described above. At the time point t2, the build-up of a measurable second braking torque begins, which is built up by the service brake system 6. The characteristic curve II of this second braking torque is shown by way of example by the dashed curve. It should be noted at this point that both the characteristic curve I and the characteristic curve II are examples. For example, it may be essential that, at the start of the emergency braking, almost immediately and without delay, a first braking torque is provided only by the electric motor 4 and, in the further course of the emergency braking of time, in a subsequent time phase, which in the example in FIG. 2 is between time points t2 and t3, the first braking torque and the measurable second braking torque are simultaneously generated.

If the service brake system 6 is a two-piston slip control system, the time point t2, which elapses from the start of the emergency braking at time to, is reached at approximately 200 ms. If the service brake system 6 is instead a six-piston slip control system, then the time point t2 is then reached at approximately 150 ms. If the service brake system 6 is instead an electromechanical brake booster, the time point t2 is reached at approximately 30 ms.

This measurable build-up of the second braking torque begins from this time point t2. As shown in the representation in FIG. 2, it rises, for example continuously in this example, until it has reached the braking torque limit value $B_G$ at the time point t3. In the example shown in FIG. 2, the first braking torque is reduced from the time point t2. This takes place for example continuously up to the time point t3. At the time point t3, the first braking torque is 0. It is possible for the two characteristic curves I and II to be formed in the time interval between t2 and t3 in such a manner that the two braking torques for example result in an approximately constant sum value.

For example, this sum value is generated over the entire time interval between t2 and t3. For example, the characteristic curve II may be different in the time interval between t2 and t3. For example, it may also depend on environmental conditions, which may be taken into account.

For example, the reduction in the first braking torque takes place in the time interval t2 to t3 as a function of the increase in the second braking torque on the basis of the second characteristic curve II. For example, this function is such that the above-mentioned sum value is produced by the sum of the two braking torques, for example over the entire time interval between t2 and t3.

In the representation according to the diagram of FIG. 2, from the time point t3 the total braking torque is provided only by the second braking torque. This is also shown by the corresponding characteristic curve II. For example, from the time point t3, the second braking torque is for example maintained from the braking torque limit value $B_G$ until the motor vehicle 1 is stationary. For example, in this time interval from t3, the second braking torque may also be kept in a value range between the braking torque limit value $B_G$ and a value which is at most 5% lower than this.

The time point t3 is reached after approximately 600 ms when the service brake system 6 is a two-piston slip control system. If the service brake system 6 is a six-piston slip control system, the time point t3 is reached after approximately 400 ms. If the service brake system is an electromechanical brake booster, the time point t3 is reached after approximately 200 ms.

LIST OF REFERENCE NUMERALS

1 Motor vehicle
2a Right front wheel
2b Right rear wheel
3 Electric drive
4 Electric motor
5 Longitudinal dynamics system
6 Service brake system
7 Slip control system
8 Dynamic stability control system
9 Electronic processing unit
I Curve
B Braking torque
$B_G$ Braking torque limit value
t Time
t0 Time point
t1 Time point
t2 Time point
t3 Time point The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for decelerating a motor vehicle during emergency braking, wherein the emergency braking is automatically carried out by a longitudinal dynamics system of the motor vehicle, comprising:
   automatically generating, for emergency braking, a total braking torque by the longitudinal dynamics system of the motor vehicle; and
   generating a first braking torque at least as a proportion of the total braking torque by an electric motor of an electric drive of the motor vehicle in a time interval beginning with the automatic initiation of the emergency braking and shorter than the total duration of the emergency braking, in which time interval the total braking torque cannot yet be generated solely by a service brake system of the longitudinal dynamics system; wherein a first time interval in which only the first braking torque is generated and built up to a braking torque limit value at which an anti-lock braking system of the motor vehicle is activated is shorter than a second time interval in which the first braking torque and a measurable second braking torque are generated simultaneously.

2. The method of claim 1, wherein during an automatic starting of emergency braking by the longitudinal dynamics system in a time interval beginning with the automatic initiation of emergency braking up to a measurably generated second braking torque of the service brake system, generating only the first braking torque of the electric motor to apply the total braking torque.

3. The method of claim 1, wherein the first braking torque is automatically generated only up to a maximum of a braking torque limit value, at which an anti-lock braking system of the motor vehicle is activated.

4. The method of claim 3, wherein the build-up of the first braking torque up to the braking torque limit value takes place faster than a time interval beginning with the automatic initiation of the emergency braking up to a measurably generated second braking torque of the service brake system.

5. The method of claim 1, wherein in a time interval shorter than the total duration of the emergency braking in which the first braking torque and a measurable second braking torque are generated simultaneously, the two braking torques are generated in such a manner that their sum value is substantially constant.

6. The method of claim 1, wherein in a time interval of the emergency braking in which the first braking torque and a measurable second braking torque are generated simultaneously, the first braking torque is continuously reduced and the second braking torque is continuously increased.

7. The method of claim 6, wherein the reduction in the first braking torque takes place in such a manner that the first braking torque is zero when the second braking torque is increased to a braking torque limit value at which an anti-lock braking system of the motor vehicle is activated.

8. The method of claim 1, wherein the motor vehicle is operated autonomously with autonomy level 5.

9. A motor vehicle having a plurality of wheels and having an electric drive for generating electric drive energy for the motor vehicle, and having a longitudinal dynamics system which uses an electric motor of the electric drive of the motor vehicle at least during an emergency braking of the motor vehicle and has a separate service brake system, and having an electronic processing circuit which is, during emergency braking of the motor vehicle, configured for:
   automatically generating control signals for a total braking torque for the longitudinal dynamics system of the motor vehicle; and
   generating control signals for a first braking torque at least as a proportion of the total braking torque using the electric motor of the electric drive of the motor vehicle in a time interval beginning with the automatic initiation of the emergency braking and shorter than the total duration of the emergency braking, in which time interval the total braking torque cannot yet be generated solely by a service brake system of the longitudinal dynamics system; wherein a first time interval in which only the first braking torque is generated and built up to a braking torque limit value at which an anti-lock braking system of the motor vehicle is activated is shorter than a second time interval in which the first braking torque and a measurable second braking torque are generated simultaneously.

10. The method of claim 2, wherein the first braking torque is automatically generated only up to a maximum of a braking torque limit value, at which an anti-lock braking system of the motor vehicle is activated.

11. The method of claim 10, wherein the build-up of the first braking torque up to the braking torque limit value takes place faster than a time interval beginning with the automatic initiation of the emergency braking up to a measurably generated second braking torque of the service brake system.

12. The method of claim 2, wherein in a time interval shorter than the total duration of the emergency braking in which the first braking torque and a measurable second braking torque are generated simultaneously, the two braking torques are generated in such a manner that their sum value is substantially constant.

13. The method of claim 3, wherein in a time interval shorter than the total duration of the emergency braking in which the first braking torque and a measurable second braking torque are generated simultaneously, the two braking torques are generated in such a manner that their sum value is substantially constant.

14. The method of claim 4, wherein in a time interval shorter than the total duration of the emergency braking in which the first braking torque and a measurable second braking torque are generated simultaneously, the two braking torques are generated in such a manner that their sum value is substantially constant.

15. The method of claim 2, wherein in the time interval of the emergency braking in which the first braking torque and a measurable second braking torque are generated simultaneously, the first braking torque is continuously reduced and the second braking torque is continuously increased.

16. The method of claim 3, wherein in the time interval of the emergency braking in which the first braking torque and a measurable second braking torque are generated simultaneously, the first braking torque is continuously reduced and the second braking torque is continuously increased.

17. The method of claim 4, wherein in the time interval of the emergency braking in which the first braking torque and a measurable second braking torque are generated simultaneously, the first braking torque is continuously reduced and the second braking torque is continuously increased.

18. The method of claim 5, wherein in the time interval of the emergency braking in which the first braking torque and a measurable second braking torque are generated simultaneously, the first braking torque is continuously reduced and the second braking torque is continuously increased.

19. The method of claim 2, wherein a first time interval in which only the first braking torque is generated and built up to a braking torque limit value at which an anti-lock braking system of the motor vehicle is activated is shorter than a second time interval in which the first braking torque and a measurable second braking torque are generated simultaneously.

* * * * *